Patented Feb. 24, 1931

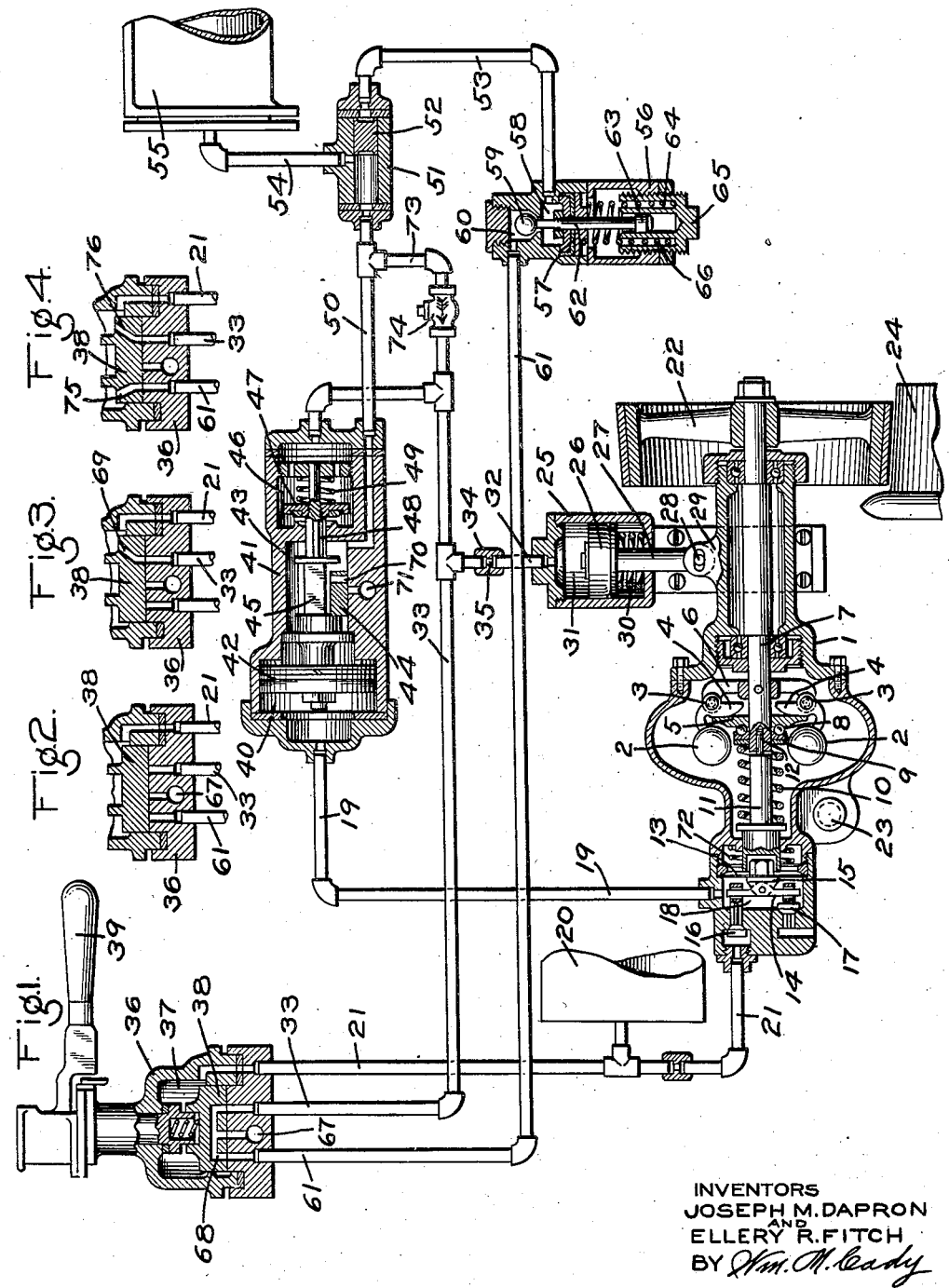

1,793,589

UNITED STATES PATENT OFFICE

JOSEPH M. DAPRON, OF ST. LOUIS, MISSOURI, AND ELLERY R. FITCH, OF WESTWOOD, NEW JERSEY, ASSIGNORS TO THE WESTINGHOUSE AIR BRAKE COMPANY, OF WILMERDING, PENNSYLVANIA, A CORPORATION OF PENNSYLVANIA

SPEED-CONTROLLED BRAKE

Application filed January 7, 1928. Serial No. 245,106.

This invention relates to brakes, and more particularly to a brake in which the braking power is controlled by the speed of the train.

One object of our invention is to provide an improved apparatus for regulating the braking force in proportion to the speed of the train.

Another object of our invention is to provide an apparatus for regulating the braking power in proportion to the speed of the train, in which the braking force is maintained at a maximum within the wheel sliding limit for a given train speed.

Another object of our invention is to provide an apparatus for regulating the braking power according to the speed of the train, in which means are provided for maintaining a degree of braking power independently of the speed control means when the train is stopped or is running at a very low speed.

Other objects and advantages will appear in the following more detailed description of the invention.

In the accompanying drawing, Fig. 1 is a sectional diagrammatic view of a speed controlled brake apparatus embodying our invention; Fig. 2 a sectional view of the brake valve device with the rotary valve in lap position; Fig. 3 a sectional view of the brake valve device, with the rotary valve in service application position; and Fig. 4 a sectional view of the brake valve device, with the rotary valve in emergency application position.

According to our invention, means are provided for charging a regulating pipe with fluid at a pressure corresponding with the speed of the train and means controlled by the pressure in the regulating pipe for supplying fluid to the brake cylinder at a pressure corresponding with the pressure of fluid in the regulating pipe. In the embodiment shown in the drawing, a centrifuge is employed which is mounted in a casing 1.

The centrifuge may comprise the usual governor balls 2 adapted to swing on pivot pins 3 and having cam arms 4 which bear against a pressure plate 5. The pivot pins 3 are carried by a cross head 6 which is secured to a driving shaft 7.

The plate 5 is slidable on the shaft 7 and sliding movement of the plate is transmitted through a ball bearing 8 to a spring plate 9 which engages one end of a coil spring 10. The other end of the spring engages a shoulder of a non-rotating shaft 11, the end of the shaft having a guide portion 12 which extends into a bore provided at the end of the driving shaft 7. The other end of the shaft 11, when the shaft is moved longitudinally, is adapted to engage a flexible diaphragm 13.

Carried by said diaphragm is a crosshead 14 which is pivotally mounted on a member 15 secured to the diaphragm. One end of the crosshead loosely extends through an opening in a stem carrying a valve 16 and the other end of the crosshead loosely extends through an opening in a stem carrying a valve 17. The valves 16 and 17 seat in opposite directions, so that movement of the crosshead in one direction tends to seat one valve and unseat the other, while movement in the opposite direction tends to unseat the first valve and seat the other valve.

Chamber 18 at one side of the diaphragm 13 containing the crosshead 14, is connected to a regulating pipe 19 and the valve 16 controls communication from a main reservoir 20 or other source of fluid under pressure through pipe 21 to chamber 18, while valve 17 controls communication from chamber 18 to the atmosphere.

In order that the centrifuge may be rotated only when the brakes are to be applied, a driving pulley 22 may be secured to the end of the driving shaft 7, and the casing 1 is mounted to swing on a pivot pin 23, the parts being so disposed that the pulley when shifted will engage the tread surface of one of the vehicle wheels 24.

For shifting the casing 1 and the pulley 22 into and out of engagement with the vehicle wheel, a cylinder 25 is provided, in which is mounted a piston 26. The piston 26 is provided with a stem 27 having a pin 28 secured at the outer end, which pin works in an elongated slot provided in a lug 29 carried by the casing 1.

The piston 26 is subject to the pressure of a coil spring 30 which urges the piston, and consequently the casing 1 in a direction to move the pulley out of engagement with the wheel 24. Piston chamber 31 of piston 26 is connected through a branch pipe 32 to a straight air brake pipe 33 and pipe 32 is provided with a coupling 34 having a restricted port 35.

A brake valve device 36 is provided comprising a casing having a valve chamber 37 containing a rotary valve 38, which valve is adapted to be operated by a handle 39. The straight air pipe 33 leads to the seat of rotary valve 38 and the regulating pipe 19 is connected to the piston chamber 40 of a relay valve device 41, which may comprise a casing having a piston 42 contained in chamber 40 and having a valve chamber 43 containing a slide valve 44 operable by a stem 45 secured to piston 42. The relay valve device is also provided with a valve chamber 46 containing a poppet valve 47 having a stem 48 adapted to be engaged by the piston stem 45. A spring 49 urges the valve 47 to its seat and said valve controls communication from valve chamber 46 to valve chamber 43.

The valve chamber 46 is connected to the straight air pipe 33 and valve chamber 43 is connected with a pipe 50 which leads to a double check valve device comprising a casing 51 containing a double check valve 52. One side of the double check valve 52 is connected to pipe 50 and the opposite side is connected to a pipe 53. When the double check valve 52 is in the right hand position shown in the drawing, the pipe 50 is connected with a pipe 54 leading to a brake cylinder 55. When the double check valve 52 is in its left hand position, pipe 53 is connected to brake cylinder pipe 54.

A protection valve device 56 is provided comprising a casing in which a piston 57 is contained. The chamber 58 at one side of the piston is connected to pipe 53.

A ball check valve 59 controls communication from chamber 58 to a chamber 60 which is connected to an emergency brake pipe 61 leading to the seat of the rotary valve 38 of the brake valve device. The piston 57 is provided with a stem 62 which is adapted to engage and operate the check valve 59 and said stem also extends in the opposite direction and is provided at its outer end with a guide piston 63 which is guided in a cylinder portion 64 of a cap nut 65. The piston 57 is subject to the pressure of a coil spring 66 such that when the fluid pressure in chamber 58 acting on piston 57 has been increased to a predetermined degree, the piston will be moved against the pressure of the spring so as to permit the valve 59 to seat.

In the release position of the rotary valve 38 of the brake valve device 36, both the straight air pipe 33 and the emergency pipe 61 are connected to an atmospheric exhaust port 67, through a cavity 68 in the rotary valve. The piston chamber 31 being connected to the straight air pipe 33, piston 26 will be maintained in the position shown in the drawing by spring 30, so that the pulley 22 is held out of engagement with the wheel 24.

If it is desired to effect a service application of the brakes, the brake valve handle 39 is turned to service position, in which, as shown in Fig. 3, the straight air pipe 33 is connected through a port 69 in the rotary valve 38 with valve chamber 37. The main reservoir pipe 21 being connected to valve chamber 37, fluid at main reservoir pressure is supplied to the straight air pipe 33 and flowing through pipe 32 to piston chamber 31, the piston 26 is thereby actuated to cause the pulley 22 to engage the wheel 24 The driving shaft 7 is then rotated at a speed proportioned to the speed of the vehicle and the governor balls 2 of the centrifuge move out in the usual manner and cause the cam arms 4 to act on the plate 5, so as to move said plate toward the left an amount corresponding with the speed of the train.

The spring 10 is thus compressed a proportional amount, and a corresponding pressure is transmitted through the shaft 11 to the diaphragm 13. The diaphragm 13 is then shifted toward the left, so that the crosshead 14 operates to seat the valve 17 and unseat the valve 16. Fluid under pressure is thus supplied by the unseating of valve 16 from the main reservoir 20 to the chamber 18 and the regulating pipe 19. When the fluid pressure in chamber 18 has been increased to a degree slightly exceeding the pressure of spring 10, the diaphragm 13 will be shifted to the right, so as to permit the valve 16 to seat and cut off the further flow of fluid to the chamber 18 and the pipe 19.

Fluid under pressure supplied to the straight air pipe 33, flows to chamber 46 of the relay valve device and the valve 47 being unseated, owing to the piston 42 having been shifted toward the right by fluid under pressure supplied from the regulating pipe 19 to piston chamber 40, fluid under pressure flows from valve chamber 46 to valve chamber 43 and thence to pipe 50. If the double check valve 52 is not in its right hand position, it will be shifted to this position by fluid under pressure supplied to the pipe 50, so that communication is opened to permit flow of fluid from pipe 50 to pipe 54 and the brake cylinder 55.

When the pressure of fluid supplied from the straight air pipe 33 to valve chamber 43 and acting on the inner face of piston 42, slightly exceeds the pressure of fluid supplied to the regulating pipe 19 and piston chamber 40, the piston 42 will be moved toward the left sufficiently to permit the valve 47 to seat. Since the pressure supplied to the regulating pipe 19 is proportional to the speed of the train, the relay valve device will operate to supply fluid to the brake cylinder at a pressure also proportional to the speed of the train, as will be evident.

As the brakes are applied, the speed of the train reduces and the rotative speed of the centrifuge also reduces so that the plate 5 moves toward the right to reduce the compression of the spring 10. The pressure of spring 10 on the diaphragm 13 being reduced, the higher pressure of fluid in chamber 18 operates to shift the diaphragm 13 toward the right, so as to unseat the valve 17 while the valve 16 is held seated. Fluid is then vented from chamber 18 to the atmosphere, until the pressure in said chamber is reduced to a degree slightly less than the pressure of spring 10, when the valve 17 will be moved to its seat by movement of the movement of diaphragm 13 toward the left. The pressure of fluid being thus reduced in the regulating pipe 19 and in piston chamber 40, the higher pressure of fluid acting in valve chamber 43 on piston 42 will operate to shift the piston toward the left until a port 70 in slide valve 44 registers with exhaust port 71. Fluid under pressure is then vented from valve chamber 43 and from the brake cylinder 55 through pipe 50 until the pressure in valve chamber 43 has been reduced to a degree slightly less than the pressure of fluid in the regulating pipe 19 and in the piston chamber 40, when the piston 42 will move toward the right so as to cause the valve 44 to cut off communication between the port 70 and the exhaust port 71.

With a continuous reduction in the speed of the train, there will follow a continuous reduction in the pressure of the spring 10 on the diaphragm 13, and consequently the valve 17 will probably not actually open and close but will assume a position, such that the rate of reduction in pressure in chamber 18 and in the regulating pipe 19 will be proportional to the rate of reduction in the speed of the train. In a like manner, the continuous reduction in pressure in piston 40, will cause the piston 42 to shift the valve 44 to a position, such that the opening from port 70 to exhaust port 71 will permit the pressure in the valve chamber 43 and in the brake cylinder 55 to reduce at a rate proportional to the rate at which the speed of the train reduces.

The cam surfaces of the cam arms 4 which engage the pressure plate 5 may be shaped to provide any desired relation between a given train speed and the pressure applied to the spring 10, but preferably, the cam surfaces are such that the pressure exerted by the spring 10 on the diaphragm 13 will be such that the corresponding brake cylinder pressure will be sufficient to provide the maximum braking power which can be employed at a given train speed without causing the wheels to slide under average conditions of adhesion between the wheel and the rail.

If, however, for any reason, the wheels should stop or tend to stop rotating, the more rapid reduction in the rotative speed of the centrifuge will cause a more rapid reduction in pressure in the regulating pipe 19 and a corresponding operation of the relay valve device to more rapidly reduce the pressure in the brake cylinder to a point where the normal rate of rotation of the vehicle wheels will be resumed.

In order to provide for holding the car when standing or when the speed of the car is very low, a preliminary spring 72 may be employed which constantly acts on the flexible diaphragm 13 with a predetermined pressure. The diaphragm 13 is then operated by the spring to open the valve 16 and permit the flow of fluid under pressure to the chamber 18 until the pressure in said chamber has been increased to a degree slightly in excess of the pressure of the spring 72, when the diaphragm is operated to close the valve 16. A pressure is thus maintained at all times in the regulating pipe 19 which corresponds substantially with the pressure of spring 72, so that when the brakes are applied, if the brake valve is held in service position, when the train is brought to a stop, a predetermined pressure will be maintained in the brake cylinder which will correspond with the pressure of fluid in the regulating pipe 19 and in the piston chamber 40, as determined by the spring 72. The same brake cylinder pressure will also be provided at very low speeds.

The brakes may be released by moving the brake valve handle to release position, in which the straight air pipe 33 is connected to the exhaust port 67. Any fluid remaining in the brake cylinder which is not released by way of the relay valve device, will be exhausted through a by-pass pipe 73 which connects pipe 50 with the straight air pipe 33 and which is provided with a check valve 74 for preventing flow of fluid from the straight air pipe directly to the pipe 50.

In order to ensure that the operator may secure an application of the brakes even if the centrifuge apparatus or the relay valve device should for any reason fail to function, an emergency position is provided in the brake valve device, in which a port 75 in the rotary valve 38 registers with pipe 61, and in which a port 76 registers with the straight air pipe 33. Fluid under pressure is therefore supplied in emergency position to the emergency pipe 61 and flows past the ball check 59 to pipe 53. The double check valve 52 is then shifted to the left by the fluid pressure in pipe 53, permitting the flow of fluid under pressure from pipe 53 to pipe 54 and the brake cylinder 55.

When the pressure of fluid acting on the piston 57 has been increased to a degree slightly exceeding the pressure of the spring 66, the piston 57 will be shifted so as to permit the valve 59 to seat and thus cut off the further flow of fluid to the brake cylinder, thereby limiting the pressure of fluid supplied to the brake cylinder in emergency position to a predetermined degree.

Upon moving the brake valve handle 39 to release position, the pressure in pipe 61 is released and the check valve 59 will then permit flow of fluid from pipe 53 and the brake cylinder to pipe 61 and the atmosphere, and the pressure in chamber 58 being reduced to a degree slightly less than the pressure of spring 66, the piston 57 will be moved upwardly so as to hold the valve 59 away from its seat.

With our invention, a brake retarding force may be employed which is close to the limit, before wheel sliding takes place, such retarding force being higher when the speed of the train is high, since at high speeds, a much greater retarding force may be applied without possibility of wheel sliding.

While one illustrative embodiment of the invention has been described in detail, it is not our intention to limit its scope to that embodiment or otherwise than by the terms of the appended claims.

Having now described our invention, what we claim as new and desire to secure by Letters Patent, is:—

1. In a fluid pressure brake, the combination with a brake cylinder, of a chamber, valve means controlled by the pressure in said chamber for regulating the pressure in the brake cylinder in proportion to any fluid pressure present in said chamber, a spring, a valve device operated according to the pressure of said spring for regulating the pressure in said chamber, and means operated according to the speed of the vehicle for varying the pressure of said spring.

2. In a fluid pressure brake, the combination with a brake cylinder, of means for regulating the pressure of fluid supplied to the brake cylinder including a pressure exerting element, a speed governor operated in accordance with the speed of the vehicle for varying the pressure exerted by said element, and means associated with said governor for varying the pressure exerted by said element in proportion to the speed in such manner that the brake cylinder pressure will provide a maximum vehicle retarding force which will not cause wheel sliding at any vehicle speed.

3. In a fluid pressure brake, the combination with a brake cylinder, of means for regulating the pressure of fluid supplied to the brake cylinder including a pressure exerting element, a speed governor operated in accordance with the speed of the vehicle for varying the pressure exerted by said element, and means associated with said governor for varying the ratio of pressure exerted by said element with respect to speed of the vehicle so that the ratio between the braking force and the speed of the vehicle will remain substantially constant.

4. The method of applying braking force to retard a vehicle which consists in regulating the braking force as the speed of the vehicle varies, so that the ratio between the braking force and the speed of the vehicle remains substantially constant throughout the speed range of the vehicle.

5. In a fluid pressure brake, the combination with a brake cylinder, of means for regulating the pressure of fluid supplied to the brake cylinder, including a pressure exerting element, and a speed governor operated according to the speed of the vehicle and having governor balls provided with arms having cam faces which operate to effect a variation in the pressure exerted by said element.

6. In a fluid pressure brake, the combination with a brake cylinder, of means for regulating the pressure of fluid supplied to the brake cylinder, including a spring, the pressure of which determines the brake cylinder pressure, a speed governor operated in proportion to the speed of the vehicle and comprising governor balls having arms provided with cam faces, and a member in engagement with said cam faces for actuating said spring to thereby vary the pressure exerted by the spring.

7. In a fluid pressure brake, the combination with a brake cylinder, of a chamber, valve means operated according to the pressure of fluid in said chamber for regulating the pressure in the brake cylinder, a valve device operated according to the pressure applied thereto for varying the pressure of fluid in said chamber, and a vehicle speed controlled governor for varying the pressure on said valve device, said valve device being subject to an initial pressure whereby said valve device operates to maintain an initial pressure in said chamber.

8. In a fluid pressure brake, the combination with a brake cylinder, of a chamber, valve means operated according to the pressure of fluid in said chamber for regulating the pressure in the brake cylinder, a valve device operated according to the pressure applied thereto for varying the pressure of fluid in said chamber, a vehicle speed controlled governor for varying the pressure on said valve device, and a spring exerting an initial pressure on said valve device.

9. In a fluid pressure brake, the combination with a brake cylinder, of a chamber, valve means operated according to the pressure of fluid in said chamber for regulating the pressure in the brake cylinder, and means for varying the pressure in said chamber comprising a spring and a diaphragm subject to the opposing pressures of said chamber and said spring, valve means operated by said diaphragm for regulating the fluid pressure in said chamber, a speed governor operated in proportion to the speed of the train for varying the pressure of said spring, and a spring acting on said diaphragm for operating said diaphragm and valve means to maintain an initial pressure in said chamber.

10. In a fluid pressure brake, the combination with a brake cylinder, of a chamber, valve means operated according to the pressure of fluid in said chamber for regulating the pressure in the brake cylinder, means for varying the pressure in said chamber according to the speed of the train, a brake valve device having a service position in which fluid under presure is supplied to said valve means and having an emergency position in which fluid under pressure is supplied to the brake cylinder, independently of said valve means.

11. In a fluid pressure brake, the combination with a brake cylinder, of a chamber, valve means operated according to the pressure of fluid in said chamber for regulating the pressure in the brake cylinder, means for varying the pressure in said chamber according to the speed of the train, a brake valve device having a service position in which fluid under pressure is supplied to said valve means and having an emergency position in which fluid under pressure is supplied to said valve means and also to the brake cylinder, independently of said valve means.

12. In a fluid pressure brake, the combination with a brake cylinder, of means for regulating the pressure of fluid supplied to the brake cylinder according to the speed of the train including a speed governor and means operated by fluid under pressure for operatively connecting said speed governor to a rotating element of the vehicle.

13. In a fluid pressure brake, the combination with a brake cylinder, of means for regulating the pressure of fluid supplied to the brake cylinder according to the speed of the train including a speed governor and means operated by fluid under presure supplied in applying the brakes for operatively connecting said speed governor to a rotating element of the vehicle.

In testimony whereof we have hereunto set our hands. Signed by JOSEPH M. DAPRON on the 16th day of December, 1927; and by ELLERY R. FITCH on the 29th day of December, 1927.

JOSEPH M. DAPRON.
ELLERY R. FITCH.